(12) United States Patent
White

(10) Patent No.: US 10,176,023 B2
(45) Date of Patent: Jan. 8, 2019

(54) TASK DISPATCHER FOR BLOCK STORAGE DEVICES

(71) Applicant: Scale Computing, Inc., Indianapolis, IN (US)

(72) Inventor: Philip Andrew White, Renton, WA (US)

(73) Assignee: SCALE COMPUTING, INC., Indianapolis, IN (US)

( * ) Notice: Subject to any disclaimer, the term of this patent is extended or adjusted under 35 U.S.C. 154(b) by 199 days.

(21) Appl. No.: 15/227,901

(22) Filed: Aug. 3, 2016

(65) Prior Publication Data

US 2018/0039521 A1 Feb. 8, 2018

(51) Int. Cl.
*G06F 9/46* (2006.01)
*G06F 9/54* (2006.01)

(52) U.S. Cl.
CPC ..................................... *G06F 9/54* (2013.01)

(58) Field of Classification Search
CPC .... G06F 12/06; G06F 13/00; G06F 2212/254; G06F 3/0631; G06F 3/0689; G06F 9/485; G06F 9/5016; G06F 9/547
See application file for complete search history.

(56) References Cited

U.S. PATENT DOCUMENTS

| | | | | |
|---|---|---|---|---|
| 6,675,218 B1* | 1/2004 | Mahler | ................... | H04L 29/06 370/229 |
| 9,667,723 B2* | 5/2017 | Pandya | ............... | H04L 67/1097 |
| 2003/0074465 A1* | 4/2003 | Tang | ..................... | H04L 1/1835 709/237 |
| 2006/0067356 A1* | 3/2006 | Kim | .................... | H04L 12/2803 370/452 |
| 2007/0008988 A1* | 1/2007 | Kim | .................... | H04L 12/2803 370/462 |
| 2010/0153967 A1* | 6/2010 | Ringseth | ................. | G06F 9/485 718/106 |
| 2013/0304988 A1* | 11/2013 | Totolos, Jr. | ........... | G06F 3/0613 711/114 |
| 2014/0310370 A1* | 10/2014 | Hendel | ............... | H04L 67/1097 709/212 |
| 2015/0222706 A1* | 8/2015 | Pandya | ................... | H04L 29/06 709/212 |
| 2016/0246742 A1* | 8/2016 | Kimmel | .................. | G06F 13/36 |
| 2017/0034310 A1* | 2/2017 | Victorelli | ................ | H04L 67/40 |

\* cited by examiner

*Primary Examiner* — Dong U Kim

(74) *Attorney, Agent, or Firm* — Dickinson Wright RLLP

(57) ABSTRACT

A system, method, and computer program product are provided for implementing a protocol stack for handling memory access requests associated with one or more block devices. The method includes the steps of allocating a thread to process a task associated with a memory access request for a block device; and executing the thread to process the task, wherein the thread implements a state machine that manages calls to two or more layers of the protocol stack. A task dispatcher is implemented for managing the execution of tasks using at least one thread pool, the tasks managing the calls to the various layers of the protocol stack. The protocol stack may implement abstraction layers for virtual storage devices as well as the real block devices.

15 Claims, 10 Drawing Sheets

TASK DISPATCHER FOR BLOCK STORAGE DEVICES

FIELD OF THE INVENTION

The present invention relates to a protocol stack for block storage devices, and more particularly to a task dispatcher that increases the efficiency of calls made to different layers of the protocol stack.

BACKGROUND

Some systems, including systems that implement virtual machines, may include a hardware resource that is implemented as a block device. A block device includes a number of blocks of non-volatile memory. Hard disk drives, optical drives, and solid state drives are all examples of hardware devices that can be implemented as a block device. Software is required to interact with the block device. For example, an operating system and basic driver is required to communicate with the block device over a system bus or other interface. In addition, a protocol stack may be implemented to abstract operations such as memory access requests for applications executing on the system.

The protocol stack may include a number of layers operating asynchronously. A top layer may receive a request to perform a memory access operation from an application. The top layer may process the memory access request and forward the memory access request to a lower layer of the protocol stack. The protocol stack may include any number of layers, with each layer of the protocol stack providing another level of abstraction. Finally, the last layer of the protocol stack may initiate a memory access request over a physical interface that is received by the block device. Since each layer of the protocol stack operates asynchronously, there may be a delay when forwarding requests between each layer of the protocol stack. Such delays introduce latency when accessing memory. This latency reduces the efficiency of applications that rely on accessing the memory using the protocol stack. Thus, there is a need for addressing this issue and/or other issues associated with the prior art.

SUMMARY

A system, method, and computer program product are provided for implementing a protocol stack for handling memory access requests associated with one or more block devices. The method includes the steps of allocating a thread to process a task associated with a memory access request for a block device; and executing the thread to process the task, wherein the thread implements a state machine that manages calls to two or more layers of the protocol stack. A task dispatcher is implemented for managing the execution of tasks using at least one thread pool, the tasks managing the calls to the various layers of the protocol stack. The protocol stack may implement abstraction layers for virtual storage devices as well as the real block devices.

DETAILED DESCRIPTION

Figure 1:
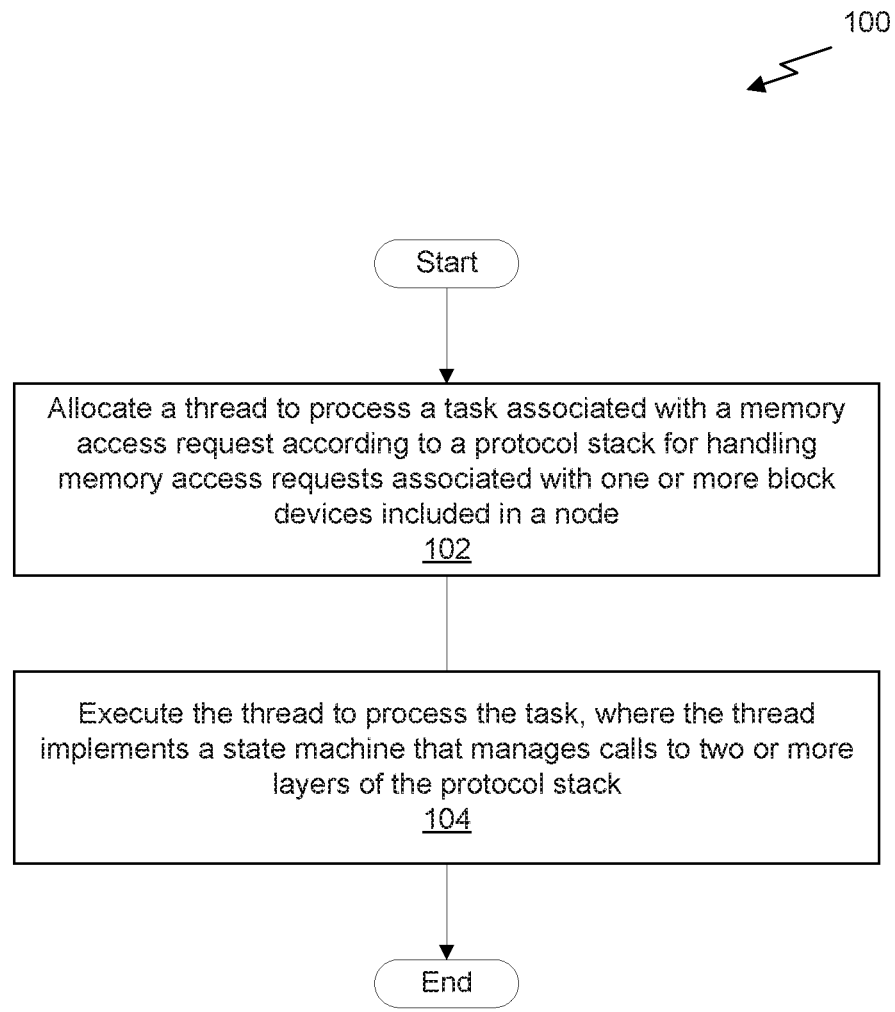
FIG. 1 illustrates a flowchart of a method for implementing a protocol stack for handling memory access requests associated with one or more block devices, according to one embodiment.

A system may include a cluster of nodes, each node configured to host a plurality of virtual machines. The cluster of nodes is configured such that each node in the cluster of nodes includes a set of hardware resources such as a processor, a memory, a host operating system, one or more storage devices, and so forth. Each node may implement one or more virtual machines that execute a guest operating system configured to manage a set of virtual resources that emulate the hardware resources of the node. Each node also implements a block engine daemon process that is configured to allocate hardware resources for a set of virtual storage devices. The block engine daemon communicates with a set of client libraries implemented within the guest operating systems of the virtual machines. The block engine daemon also implements a real storage device abstraction layer as well as a virtual storage device abstraction layer. The real storage device abstraction layer includes a set of objects corresponding to the one or more physical storage devices included in the node as well as a set of objects corresponding to one or more additional storage devices included in other nodes of the cluster. The virtual storage device abstraction layer includes a set of objects corresponding to at least one logical storage device accessible by the virtual machines.

The block engine daemon is configured to track various parameters related to the storage devices within the cluster. For example, the block engine daemon maintains data that identifies a location for each of the storage devices connected to the cluster. The block engine daemon may also implement a protocol stack for allocating space in, reading data from, and writing data to the physical storage devices. The protocol stack may consist of a plurality of abstraction layers that include a block engine server, a virtual storage device engine, a real storage device engine, and an input/output manager.

Conventionally, each of the layers of a protocol stack operates asynchronously, utilizing separate thread pools for processing the tasks associated with the separate layers. A particular layer of the protocol stack receives a task into a queue and a thread or threads configured to implement the tasks associated with the particular layer processes the tasks in the queue. Processing the tasks may include creating a new task for a different layer of the protocol stack. The new task is then added to a queue for the other layer, which is processed by a thread or threads configured to implement the tasks associated with the other layer. There may be a delay between when a task is added to the queue and when a thread processes the task. As delays are added between each layer of the protocol stack, the latency associated with the task is increased.

A new approach may utilize a common thread pool for handling tasks for multiple layers of the protocol stack. Rather than generating a new task in a queue for the next layer in the protocol stack each time a task is processed by a different layer, the thread can expedite processing by multiple layers of the protocol stack. This reduces latency by enabling a single thread to call multiple methods of different layers of the protocol stack.

FIG. 1 illustrates a flowchart of a method 100 for implementing a protocol stack for handling memory access requests associated with one or more block devices, according to one embodiment. Although the method 100 is described in the context of a program executed by a processor, the method 100 may also be performed by custom circuitry or by a combination of custom circuitry and a program. At step 102, a thread is allocated to process a task associated with a memory access request according to a protocol stack for handling memory access requests associated with one or more block devices included in a node. The block device is divided into a plurality of blocks of memory. In the context of the following description, a real storage device is any physical device capable of storing data in blocks of memory. For example, real storage devices may include hard disk drives, optical disc drives, solid state drives, magnetic media, and the like. The real storage devices may be connected to a processor via any of the interfaces well-known in the art such as Serial Advance Technology Attachment (SATA), Small Computer System Interface (SCSI), and the like. In the context of the following description, a virtual storage device is a logical drive that emulates a real storage device. Virtual storage devices provide a logical interface for the virtual machines to access data in one address space that is mapped to a second address space on one or more real storage devices. Virtual storage devices may also implement redundant data storage, such as by storing multiple copies of data in different locations.

In one embodiment, a block engine daemon implements a level of abstraction that represents the real storage devices. The level of abstraction may represent each of the real storage devices with a real storage device object, which is an instantiation of a class that includes fields storing information related to the real storage device and methods for implementing operations associated with the real storage device. The methods may include operations for allocating a block of memory within the real storage device to store data, writing data to the real storage device, and reading data from the real storage device. The block engine daemon may also implement a level of abstraction that represents the virtual storage devices. The level of abstraction may represent the virtual storage device with a virtual storage device object, which is an instantiation of a class that includes fields storing information related to the virtual storage device and methods for implementing operations associated with the virtual storage device. For example, the fields may include a mapping table that associates each logical block of memory in the virtual storage device with a corresponding block of memory in the real storage device, a size of the virtual storage device, current performance statistics for the device, and so forth. The methods may include operations for allocating a block of memory within the virtual storage device to store data, writing data to the virtual storage device, and reading data from the virtual storage device.

The block engine daemon may also implement a protocol stack for handling memory access requests. In one embodiment, the protocol stack includes a plurality of layers, each layer implemented as an object including a set of fields and/or related methods for processing the memory access request. The layers may include a block engine server that communicates with one or more block engine clients instantiated in one or more virtual machines. The layers may also include a virtual storage device engine that manages operations related to the virtual storage device objects, a real storage device engine that manages operations related to the real storage device objects, and an I/O Manager for generating system calls for accessing, via a host operating system, the real storage devices coupled to a node.

A task dispatcher may also be implemented within the block engine daemon, the task dispatcher configured to manage the execution of a plurality of tasks associated with memory access requests. The task dispatcher may manage one or more thread pools for processing a plurality of tasks associated with a plurality of memory access requests. The task dispatcher may allocate each thread to process a pending task, at least in part, according to the protocol stack.

At step 104, the thread is executed by a processor to process the task. In one embodiment, the thread implements a state machine for traversing the layers of the protocol stack. The different states in the state machine may cause the thread to call methods of the different layers of the protocol stack. In one embodiment, the protocol stack is traversed by transitioning between states of the state machine, processing portions of the task by different layers of the protocol stack.

In one embodiment, a method call is made to the block engine server when the state machine is in a first state. The block engine server may manage state information associated with the task, such as by maintaining information that specifies which block engine client transmitted the memory access request to the block engine server. The block engine server may also cause the task to transition to a second state, where a method call is made to a virtual storage device engine. The virtual storage device engine may determine a virtual storage device identifier specified by an address included in the memory access request associated with the task. The virtual storage device identifier may identify a particular virtual storage device object corresponding to the memory access request. The virtual storage device engine may call a method of the virtual storage device object that determines an address in a real storage device address space corresponding to the address in the memory access request. The method of the virtual storage device object may also cause the task to transition to a third state, where a method call is made to a real storage device engine.

The real storage device engine may determine a real storage device identifier specified by the address in the real storage device address space. The real storage device identifier may identify a particular real storage device object corresponding to the memory access request. The real storage device engine may call a method of the real storage device object that determines whether the real storage device is a local device or a remote device. The method of the real storage device object may also cause the task to transition to a new state. If the real storage device is a local device, then the new state is a fourth state, where a method call is made to an I/O manager for generating a system call for accessing the real storage device. The system call may be handled by a host operating system of the node. However, if the real storage device is a remote device, then the new state is a fifth state, where a method call is made to an block engine remote protocol that generates a memory access request that is sent to a block engine daemon of a remote node.

Once the host operating system indicates that the memory access request has been completed, either by acknowledging the write is complete, returning data associated with a read, or indicating an error occurred and the memory access request failed, the task may transition to a new state to traverse up the protocol stack. Traversal may be performed by calling callback functions specifies by each layer of the protocol stack.

In one embodiment, the task dispatcher maintains state information that identifies the direction of traversal of the protocol stack (i.e., traversing down the protocol stack or back up the protocol stack). The task dispatcher may be configured to stall a particular task whenever the direction of traversal is changed. A task may be stalled by storing any state associated with the task in a memory and pushing the task onto a queue for pending tasks.

Multiple thread pools may be maintained by the task dispatcher for handling different priority memory access requests. Threads from the thread pools may be allocated to different tasks. Furthermore, different threads may be executed in parallel by a multi-threaded processor for processing tasks substantially simultaneously.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
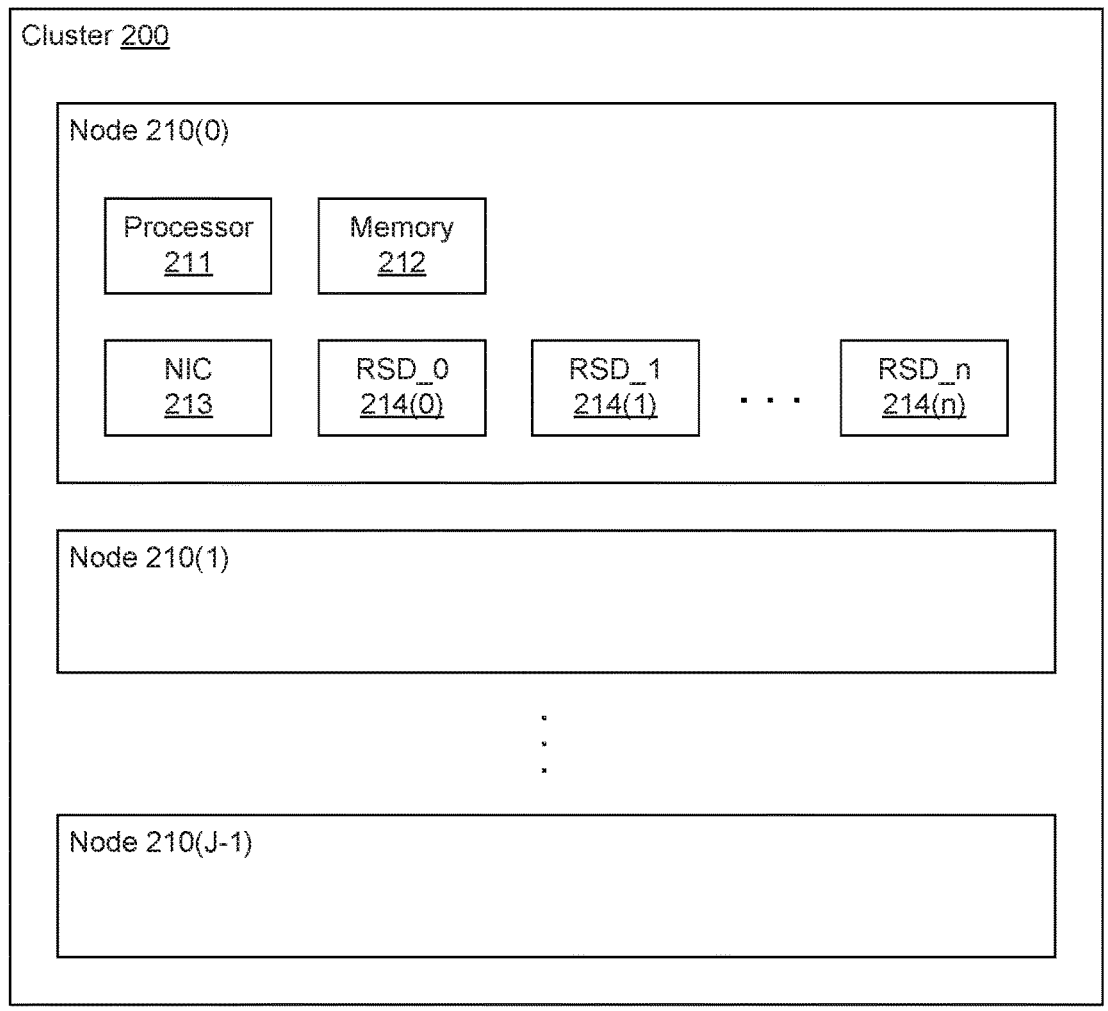
FIG. 2 illustrates a cluster having a plurality of nodes, in accordance with one embodiment.

FIG. 2 illustrates a cluster 200 having a plurality of nodes 210, in accordance with one embodiment. As shown in FIG. 2, the cluster 200 includes J nodes (i.e., node 210(0), node 210(1), . . . , node 210(J−1)). Each node 210 includes a processor 211, a memory 212, a NIC 213, and one or more real storage devices (RSD) 214. The processor 211 may be an x86-based processor, a RISC-based processor, or the like. The memory 212 may be a volatile memory such as a Synchronous Dynamic Random-Access Memory (SDRAM) or the like. The NIC 213 may implement a physical layer and media access control (MAC) protocol layer for a network interface. The physical layer may correspond to various physical network interfaces such as IEEE (Institute of Electrical and Electronics Engineers) 802.3 (Ethernet), IEEE 802.11 (WiFi), and the like. In one embodiment, the memory 212 includes a host operating system kernel, one or more device drivers, one or more applications, and the like. The host operating system kernel may be, e.g., based on the Linux® kernel such as the Red Hat® Enterprise Linux (RHEL) distribution. It will be appreciated that, although not explicitly shown, each node 210 may include one or more other devices such as GPUs, additional microprocessors, displays, radios, or the like.

As used herein an RSD 214 is a physical, non-volatile memory device such as a HDD, an optical disk drive, a solid state drive, a magnetic tape drive, and the like that is capable of storing data. The one or more RSDs 214 may be accessed via an asynchronous input/output functionality implemented by a standard library of the host operating system or accessed via a non-standard library that is loaded by the operating system, in lieu of or in addition to the standard library. In one embodiment, the host operating system may mount the RSDs 214 and enable block device drivers to access the RSDs 214 for read and write access.

The RSDs 214 may implement a file system including, but not limited to, the FAT32 (File Allocation Table—32-bit), NTFS (New Technology File System), or the ext2 (extended file system 2) file systems. In one embodiment, each RSD 214 may implement logical block addressing (LBA). LBA is an abstraction layer that maps blocks of the disk (e.g., 512B blocks of a hard disk) to a single unified address. The unified address may be 28-bit, 48-bit, or 64-bit wide that can be mapped, e.g., to a particular cylinder/head/sector tuple of a conventional HDD or other data storage space.

The memory 212 may also include a hypervisor that performs hardware virtualization. In one embodiment, QEMU (Quick EMUlator) is provided for emulating one or more VMs on each node of the cluster 200. In such embodiments, each node 210 may be configured to load a host operating system such as RHEL into the memory 212 on boot. Once the host operating system is running, the QEMU software is launched in order to instantiate one or more VMs on the node 210, each VM implementing a guest operating system that may or may not be the same as the host operating system. It will be appreciated that QEMU may generate VMs that can emulate a variety of different hardware architectures such as x86, PowerPC, SPARC, and the like.

Figure 3A:
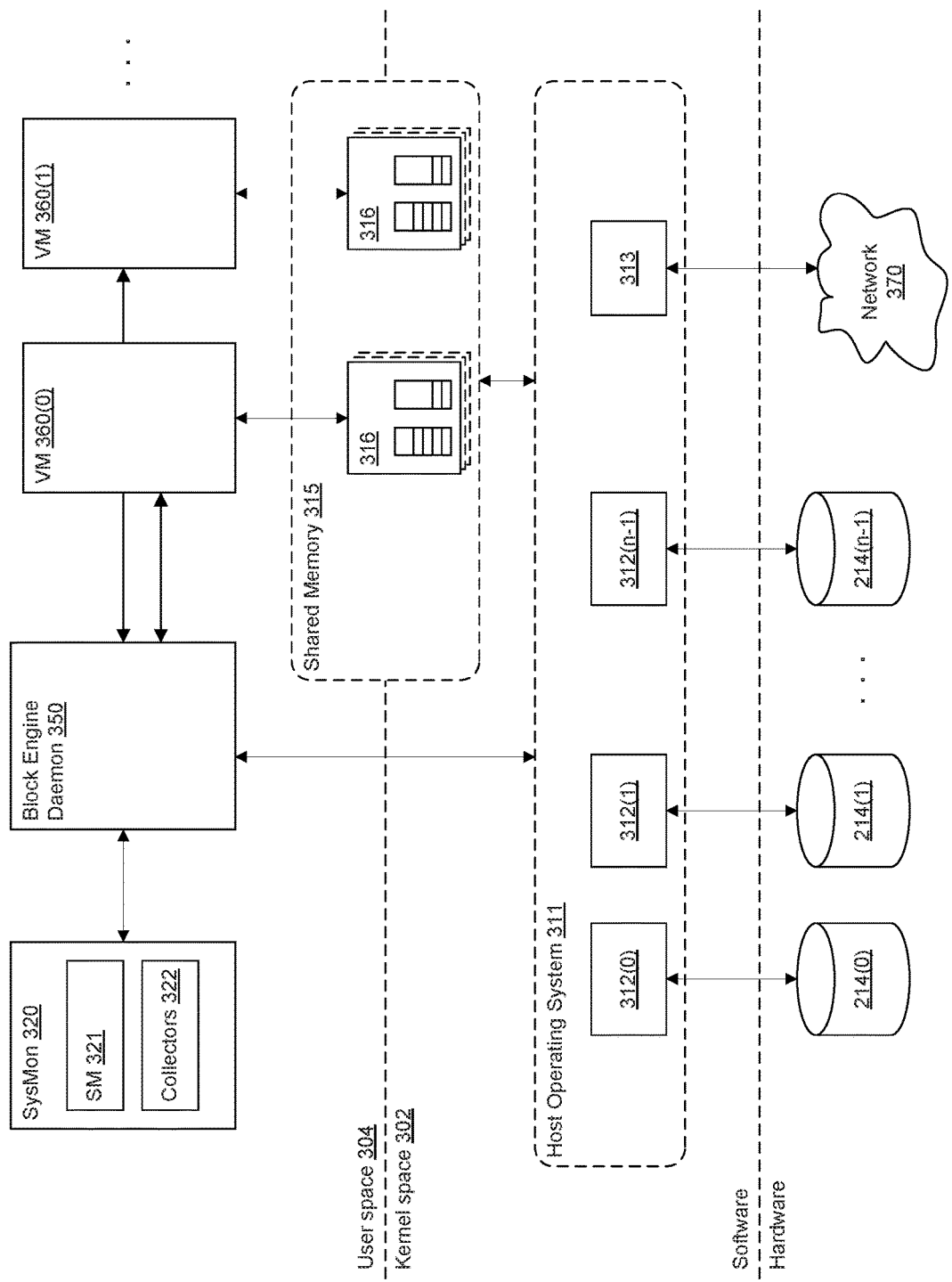
FIGS. 3A & 3B are conceptual diagrams of the architecture for a node of FIG. 2, in accordance with one embodiment.
Figure 3B:
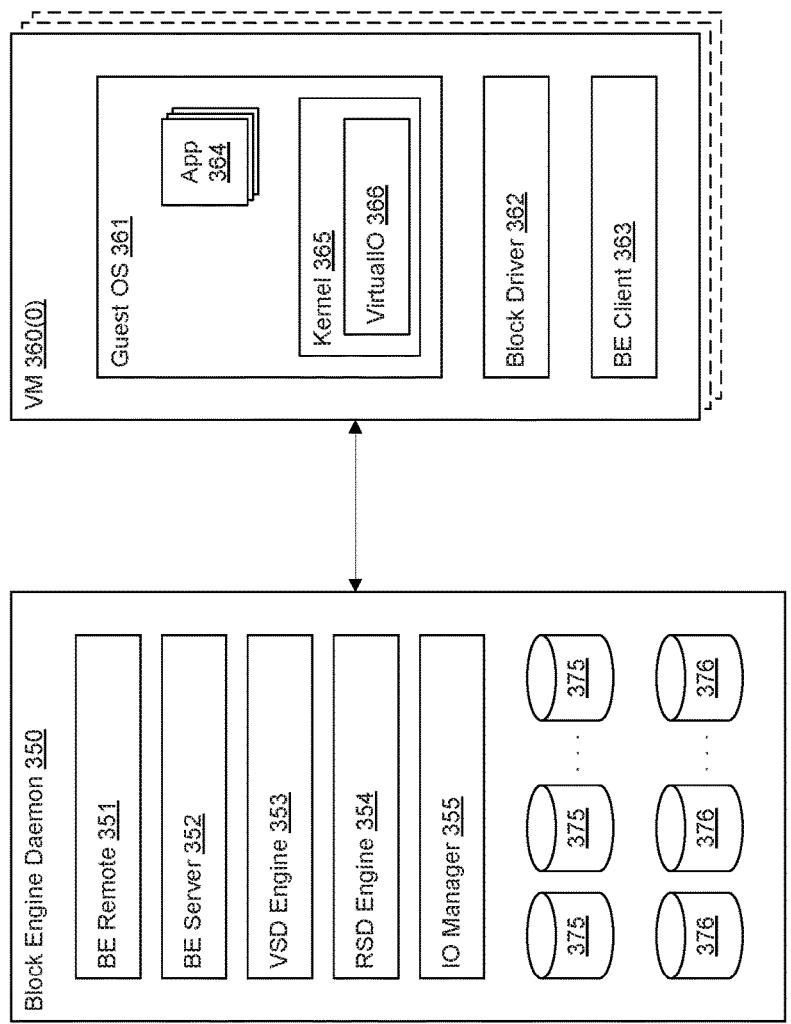

FIGS. 3A & 3B are conceptual diagrams of the architecture for a node 210 of FIG. 2, in accordance with one embodiment. As shown in FIG. 3A, the node 210 may execute a host operating system 311 that implements a protected mode of operation having at least two privilege levels including a kernel space 302 and a user space 304. For example, the host operating system 311 may comprise the Linux® kernel as well as one or more device drivers 312 and 313 that execute in the kernel space 302. The device drivers 312 enable applications in the user space 304 to read or write data from/to the RSDs 214 via a physical interface such as SATA (serial ATA), SCSI (Small Computer System Interface), FC (Fibre Channel), and the like. In one embodiment, the device drivers 312 are generic block device drivers included in the host operating system 311. The device driver 313 enables applications to communicate with other nodes 210 in the cluster 200 via a network interface, which may be wired (e.g., SONET/SDH, IEEE 802.3, etc.) or wireless (e.g., IEEE 802.11, etc.). In one embodiment, the device driver 313 is a generic network driver included in the host operating system 311. It will be appreciated that other device drivers, not explicitly shown, may be included in the host operating system 311, such as device drivers for input devices (e.g., mice, keyboards, etc.), output devices (e.g., monitors, printers, etc.), as well as any other type of hardware coupled to the processor 211.

The conceptual diagram in FIG. 3A shows the RSDs 214 and network 370 within the hardware abstraction layer. In other words, the RSDs 214 and network 370 comprise physical devices having a physical interface to the processor 211 in the node 210, either directly or indirectly through a system bus or bridge device. FIG. 3A also illustrates a software abstraction layer that includes objects and processes resident in the memory 212 of the node 210. The processes may be executed by the processor 211. For example, the host operating system 311, system monitor (SysMon) 320, Block Engine (BE) Daemon 350, and virtual machines (VMs) 360 are processes that are executed by the processor 211.

In one embodiment, the host operating system 311 may allocate a portion of the memory 212 as a shared memory 315 that is accessible by the one or more VMs 360. The VMs 360 may share data in the shared memory 315. The host operating system 311 may execute one or more processes configured to implement portions of the architecture for a node 210. For example, the host operating system 311 executes the BE Daemon 350 in the user space 304. The BE Daemon 350 is a background process that performs tasks related to the block devices coupled to the node 210 (i.e., the RSDs 214). The SysMon 320 implements a state machine (SM) 321 and a set of collectors 322 for managing the instantiation and execution of one or more VMs 360 that are executed in the user space 304. In addition, the SysMon 320 may be configured to manage the provisioning of virtual storage devices (VSDs). VSDs may be mounted to the VMs 360 to provide applications running on the VMs 360 access to the RSDs 214 even though the applications executed by the VMs 360 cannot access the RSDs 214 directly. In one embodiment, the SysMon 320 creates I/O buffers 316 in the shared memory 315 that enable the VMs 360 to read data from or write data to the VSDs mounted to the VM 360. Each VM 360 may be associated with multiple I/O buffers 316 in the shared memory 315. For example, each VSD mounted to the VM 360 may be associated with an input buffer and an output buffer, and multiple VSDs may be mounted to each VM 360.

As shown in FIG. 3B, each instance of the VM 360 implements a guest operating system 361, a block device driver 362, and a block engine client 363. The guest OS 361 may be the same as or different from the host operating system 311. The guest OS 361 comprises a kernel 365 that implements a virtual I/O driver 366 that is logically coupled to a VSD. Each VSD is a logical storage device that maps non-contiguous blocks of storage in one or more RSDs 214 to a contiguous, logical address space of the VSD. The VSD logically appears and operates like a real device coupled to a physical interface for the guest OS 361, but is actually an abstraction layer between the guest OS 361 and the physical storage blocks on the RSDs 214 coupled to the node 210, either directly or indirectly via the network 370. The guest OS 361 may execute one or more applications 364 that can read and write data to the VSD via the virtual I/O driver 366. In some embodiments, two or more VSDs may be associated with a single VM 360.

The block device driver 362 and the BE client 363 implement a logical interface between the guest OS 361 and the VSD. In one embodiment, the block device driver 362 receives read and write requests from the virtual I/O driver 366 of the guest OS 361. The block device driver 362 is configured to write data to and read data from the corresponding I/O buffers 316 in the shared memory 315. The BE client 363 is configured to communicate with the BE server 352 in the BE Daemon 350 to schedule I/O requests for the VSDs.

The BE Daemon 350 implements a Block Engine Remote Protocol 351, a Block Engine Server 352, a VSD Engine 353, an RSD Engine 354, and an I/O Manager 355. The Block Engine Remote Protocol 351 provides access to remote RSDs 214 coupled to other nodes 210 in the cluster 200 via the network 370. The BE Server 352 communicates with one or more BE Clients 363 included in the VMs 360. Again, the BE Client 363 generates I/O requests related to one or more VSDs for the BE Server 352, which then manages the execution of those requests. The VSD Engine 353 enables the BE Server 352 to generate tasks for each of the VSDs. The RSD Engine 354 enables the VSD Engine 353 to generate tasks for each of the RSDs 214 associated with the VSDs. The RSD Engine 354 may generate tasks for local RSDs 214 utilizing the I/O Manager 355 or remote RSDs 214 utilizing the BE Remote Protocol 351. The I/O Manager 355 enables the BE Daemon 350 to generate asynchronous I/O operations that are handled by the host OS 311 to read from or write data to the RSDs 214 connected to the node 210. Functions implemented by the I/O Manager 355 enable the BE Daemon 350 to schedule I/O requests for one or more VMs 360 in an efficient manner. The BE Server 352, VSD Engine 353, RSD Engine 354, I/O Manager 355 and BE Remote Protocol 351 are implemented as a protocol stack.

In one embodiment, the VSD Engine 353 maintains state and metadata associated with a plurality of VSD objects 375. Each VSD object 375 may include a mapping table that associates each block of addresses (i.e., an address range) in the VSD with a corresponding block of addresses in one or more RSDs 214. The VSD Engine 353 may maintain various state associated with a VSD such as a VSD identifier (i.e., handle), a base address of the VSD object 375 in the memory 212, a size of the VSD, a format of the VSD (e.g., filesystem, block size, etc.), and the like.

Similarly, the RSD Engine 354 maintains state and metadata associated with a plurality of RSD objects 376. Each RSD object 376 may correspond to an RSD 214 connected to the node 210 or an RSD 214 accessible on another node 210 via the network 370. The RSD Engine 354 may maintain various state associated with each RSD 214 such as an RSD identifier (i.e., handle), a base address of the RSD object 376 in the memory 212, a size of the RSD 214, a format of the RSD 214 (e.g., filesystem, block size, etc.), and the like. The RSD Engine 354 may also track errors associated with each RSD 214.

The VSD objects 375 and the RSD objects 376 are abstraction layers implemented by the VSD Engine 353 and RSD Engine 354, respectively, that enable VMs 360, via the BE Daemon 350, to store data on the RSDs 214. In one embodiment, the VSD abstraction layer is a set of objects defined using an object-oriented programming (OOP) language. As used herein, an object is an instantiation of a class and comprises a data structure in memory that includes fields and pointers to methods implemented by the class. The VSD abstraction layer defines a VSD class that implements a common interface for all VSD objects 375 that includes the following methods: Create; Open; Close; Read; Write; Flush; Discard; and a set of methods for creating a snapshot of the VSD. A snapshot is a data structure that stores the state of the VSD at a particular point in time. The Create method generates the metadata associated with a VSD and stores the metadata on an RSD 214, making the VSD available to all nodes 210 in the cluster 200. The Open method enables applications in the VMs 360 to access the VSD (i.e., the I/O buffers 316 are generated in the shared memory 315 and the VSD is mounted to the guest OS 361). The Close method prevents applications in the VMs 360 from accessing the VSD. The Read method enables the BE Server 352 to read data from the VSD. The Write method enables the BE Server 352 to write data to the VSD. The Flush method flushes all pending I/O requests associated with the VSD. The Discard method discards a particular portion of data stored in memory associated with the VSD.

In one embodiment, two types of VSD objects 375 inherit from the generic VSD class: a SimpleVSD object and a ReliableVSD object. The SimpleVSD object is a simple virtual storage device that maps each block of addresses in the VSD to a single, corresponding block of addresses in an RSD 214. In other words, each block of data in the SimpleVSD object is only stored in a single location. The SimpleVSD object provides a high performance virtual storage solution but lacks reliability. In contrast, the ReliableVSD object is a redundant storage device that maps each block of addresses in the VSD to two or more corresponding blocks in two or more RSDs 214. In other words, the ReliableVSD object provides it-way replicated data and metadata. The ReliableVSD object may also implement error checking with optional data and/or metadata checksums. In one embodiment, the ReliableVSD object may be configured to store up to 15 redundant copies (i.e., 16 total copies) of the data stored in the VSD. The SimpleVSD object may be used for non-important data while the ReliableVSD object attempts to store data in a manner that prevents a single point of failure (SPOF) as well as provide certain automatic recovery capabilities when one or more nodes experiences a failure. The VSD Engine 353 may manage multiple types of VSD objects 375 simultaneously such that some data may be stored on SimpleVSD type VSDs and other data may be stored on ReliableVSD type VSDs. It will be appreciated that the two types of VSDs described herein are only two possible examples of VSD objects inheriting from the VSD class and other types of VSD objects 375 are contemplated as being within the scope of the present disclosure.

The RSD Engine 354 implements an RSD abstraction layer that provides access to all of the RSDs 214 coupled to the one or more nodes 210 of the cluster 200. The RSD abstraction layer enables communications with both local and remote RSDs 214. As used herein, a local RSD is an RSD 214 included in a particular node 210 that is hosting an instance of the BE Daemon 350. In contrast, a remote RSD is an RSD 214 included in a node 210 that is not hosting the instance of the BE Daemon 350 and is accessible via the network 370. The RSD abstraction layer provides reliable communications as well as passing disk or media errors from both local and remote RSDs 214 to the BE Daemon 350.

In one embodiment, the RSD abstraction layer is a set of objects defined using an OOP language. The RSD abstraction layer defines an RSD class that implements a common interface for all RSD objects 376 that includes the following methods: Read; Write; Allocate; and UpdateRefCounts. Each RSD object 376 is associated with a single RSD 214. In one embodiment, the methods of the RSD class are controlled by a pair of state machines that may be triggered by either the reception of packets from remote nodes 210 on the network 370 or the expiration of timers (e.g., interrupts). The Read method enables the VSD Engine 353 to read data from the RSD 214. The Write method enables the VSD Engine 353 to write data to the RSD 214. The Allocate method allocates a block of memory in the RSD 214 for storing data. The UpdateRefCounts method updates the reference counts for each block of the RSD 214, enabling deallocation of blocks with reference counts of zero (i.e., garbage collection).

In one embodiment, two types of RSD objects 376 inherit from the RSD class: an RSDLocal object and an RSDRemote object. The RSDLocal object implements the interface defined by the RSD class for local RSDs 214, while the RSDRemote object implements the interface defined by the RSD class for remote RSDs 214. The main difference between the RSDLocal objects and the RSDRemote objects are that the I/O Manager 355 asynchronously handles all I/O between the RSD Engine 354 and local RSDs 214, while the BE Remote Protocol 351 handles all I/O between the RSD Engine 354 and remote RSDs 214.

As discussed above, the SysMon 320 is responsible for the provisioning and monitoring of VSDs. In one embodiment, the SysMon 320 includes logic for generating instances of the VSD objects 375 and the RSD objects 376 in the memory 212 based on various parameters. For example, the SysMon 320 may discover how many RSDs 214 are connected to the nodes 210 of the cluster 200 and create a different RSD object 376 for each RSD 214 discovered. The SysMon 320 may also include logic for determining how many VSD objects 375 should be created and or shared by the VMs 360 implemented on the node 210. Once the SysMon 320 has generated the instances of the VSD objects 375 and the RSD objects 376 in the memory 212, the BE Daemon 350 is configured to manage the functions of the VSDs and the RSDs 214.

Figure 4:
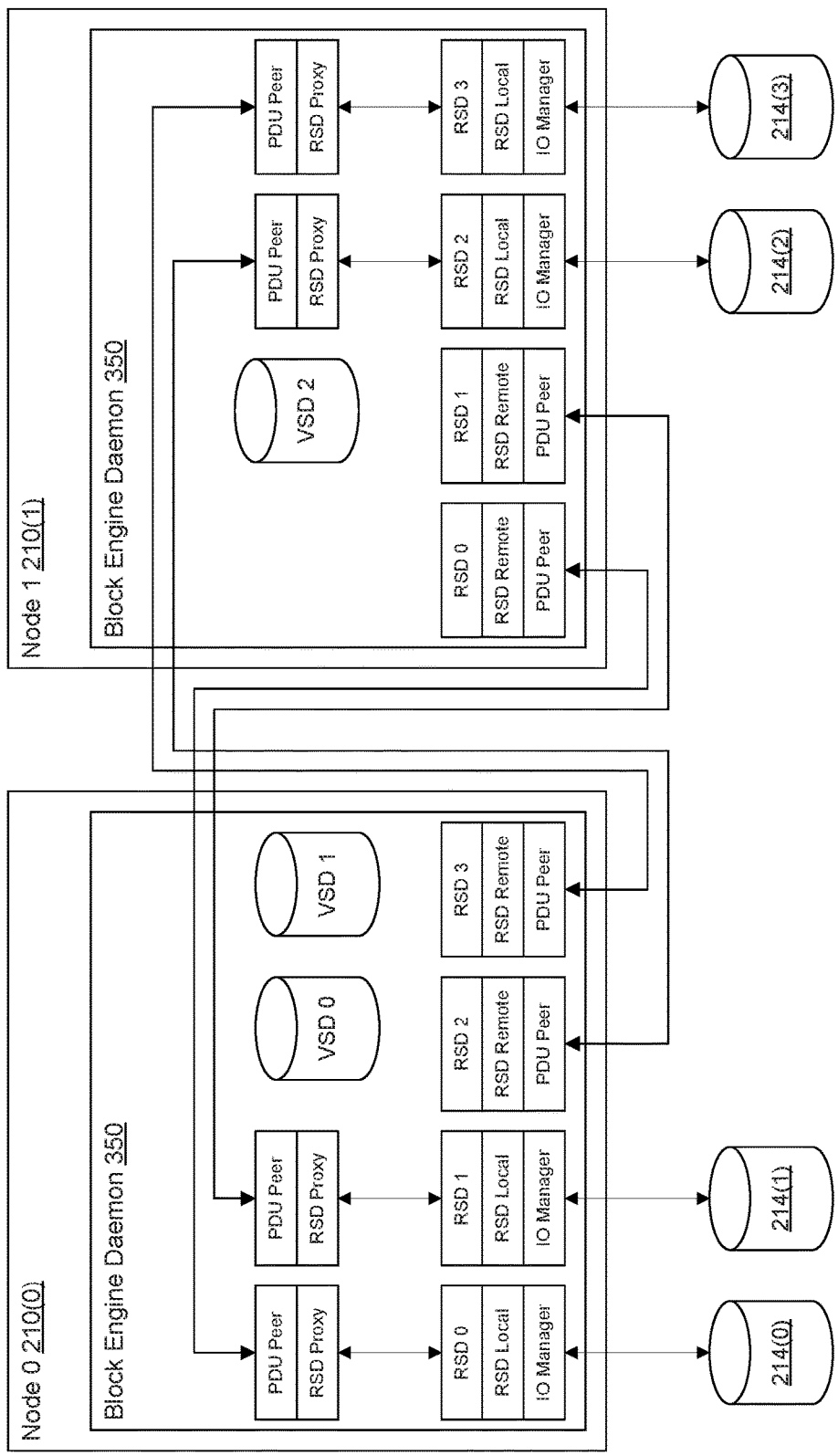
FIG. 4 illustrates the abstraction layers implemented by the block engine daemon for two nodes of the cluster, in accordance with one embodiment.

FIG. 4 is a conceptual diagram of the abstraction layers implemented by the BE Daemon 350 for two nodes 210 of the cluster 200, in accordance with one embodiment. A first node 210(0) is coupled to two local RSDs (i.e., 214(0) and 214(1)) and two remote RSDs (i.e., 214(2) and 214(3)) via the network 370. Similarly, a second node 210(1) is coupled to two local RSDs (i.e., 214(2) and 214(3)) and two remote RSDs (i.e., 214(0) and 214(1)) via the network 370. The RSD abstraction layer includes four RSD objects 376 (i.e., RSD 0, RSD 1, RSD 2, and RSD 3). In the first node 210(0), RSD 0 and RSD 1 are RSDLocal objects and RSD 2 and RSD 3 are RSDRemote objects.

The first node 210(0) accesses the first RSD 214(0) and the second RSD 214(1) via the I/O Manager library that makes system calls to the host operating system 311 in order to asynchronously read or write data to the local RSDs 214. An RSDLocal library is configured to provide an interface for applications communicating with the BE Daemon 350 to read or write to the local RSDs 214. The RSDLocal library may call methods defined by the interface implemented by the IOManager library. The first node 210(0) accesses the third RSD 214(2) and the fourth RSD 214(3) indirectly via a Protocol Data Unit Peer (PDUPeer) library that makes system calls to the host operating system 311 in order to communicate with other nodes 210 using the NIC 213. The PDUPeer library generates packets that include I/O requests for the remote RSDs (e.g., 214(2) and 214(3)). The packets may include information that specifies the type of request as well as data or a pointer to the data in the memory 212. For example, a packet may include data and a request to write the data to one of the remote RSDs 214. The request may include an address that specifies a block in the RSD 214 to write the data to and a size of the data. Alternately, a packet may include a request to read data from the remote RSD 214. The RSDProxy library unpacks requests from the packets received from the PDUPeer library and transmits the requests to the associated local RSD objects 376 as if the requests originated within the node 210.

The BE Remote Protocol 351, the BE Server 352, VSD Engine 353, RSD Engine 354, and the I/O Manager 355 implement various aspects of the RSD abstraction layer shown in FIG. 4. For example, the BE Remote Protocol 351 implements the RSDProxy library and the PDUPeer library, the RSD Engine 354 implements the RSDRemote library and the RSDLocal library, and the I/O Manager 355 implements the IOManager library. The second node 210(1) is configured similarly to the first node 210(0) except that the RSD objects 376 RSD 0 and RSD 1 are RSDRemote objects linked to the first RSD 214(0) and the second RSD 214(1), respectively, and the RSD objects 376 RSD 2 and RSD 3 are RSDLocal objects linked to the third RSD 214(2) and the fourth RSD 214(3), respectively.

The VSD abstraction layer includes three VSD objects 375 (i.e., VSD 0, VSD 1, and VSD 2). In the first node 210(0), VSD 0 and VSD 1 are ReliableVSD objects. In the second node 210(1), VSD 2 is a ReliableVSD object. It will be appreciated that one or more of the VSD objects 375 may be instantiated as SimpleVSD objects, and that the particular types of objects chosen depends on the characteristics of the system. Again, the VSD objects 375 provide an interface to map I/O requests associated with the corresponding VSD to one or more corresponding I/O requests associated with one or more RSDs 214. The VSD objects 375, through the Read or Write methods, are configured to translate the I/O request received from the BE Server 352 and generate corresponding I/O requests for the RSD(s) 214 based on the mapping table included in the VSD object 375. The translated I/O request is transmitted to the corresponding RSD 214 via the Read or Write methods in the RSD object 376.

Figure 5:
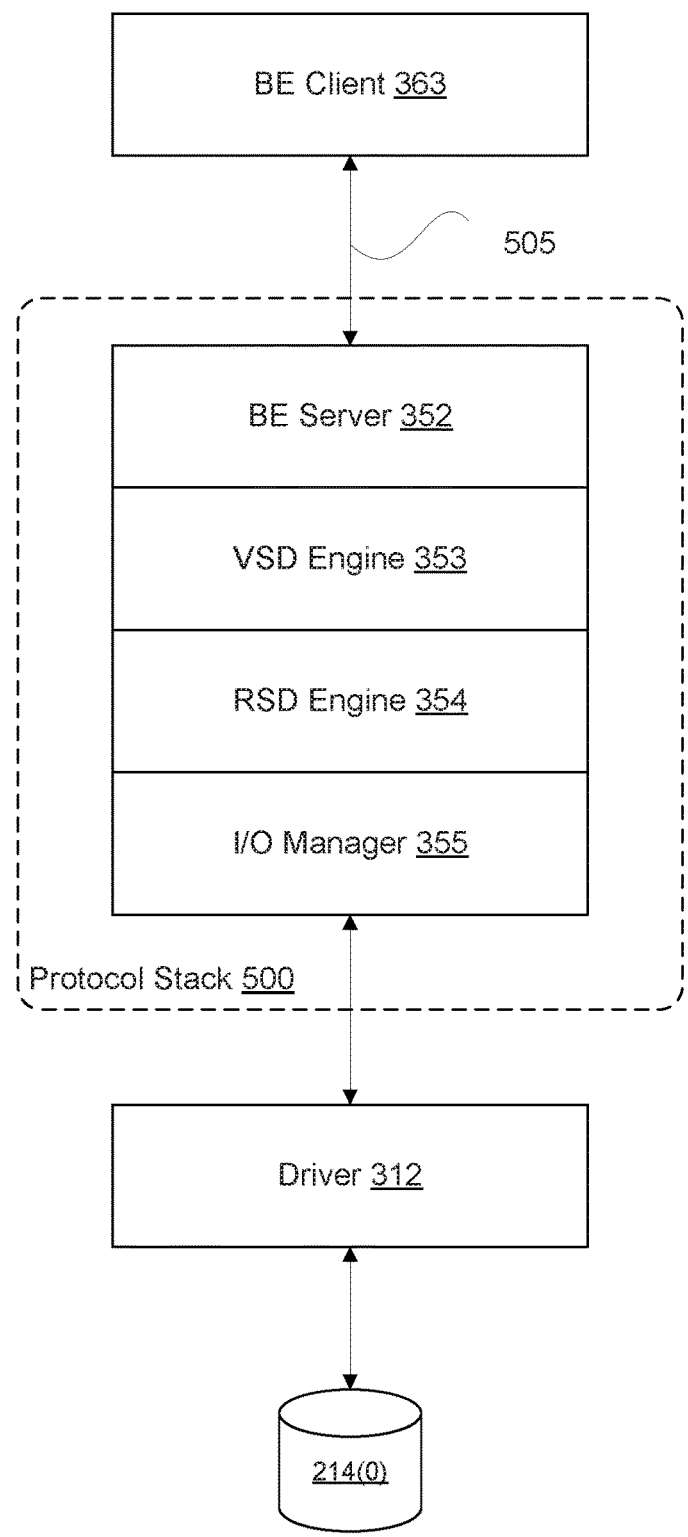
FIG. 5 illustrates a protocol stack for handling memory access requests for a block device, in accordance with one embodiment.

FIG. 5 illustrates a protocol stack 500 for handling memory access requests for a block device, in accordance with one embodiment. As shown in FIG. 5, the protocol stack 500 includes the BE Server 352, the VSD Engine 353, the RSD Engine 354, and the I/O Manager 355. The protocol stack 500 is a representation of the processes that handle memory access requests for a local RSD 214 connected to a node 210. It will be appreciated that memory access requests for a remote RSD 214 connected to the node 210 via the network 370 is handled in a similar manner except the I/O Manager 355 is replaced with the BE Remote Protocol 351.

Again, the BE Client 363 receives a memory access request for a VSD from the Virtual I/O driver 366 within the Guest OS 361 executing within a VM 360. The BE Client 363 transmits the memory access request to the BE Server 352 in order to access the VSD. The BE Server 352 may be executed periodically by the BE Daemon 350, which is also executed periodically by the processor 211 of the node 210. In other words, the host operating system 311 executes the BE Daemon 350 as a process. The BE Daemon 350 may generate one or more threads to execute the BE Server 352. The memory access requests from the BE Client 363 may be stored in a queue and popped from the queue by the BE Server 352 when executed by the BE Daemon 350. The BE Server 352 may process the memory access requests from the BE Client 363 and generate tasks to be processed by the VSD Engine 353. The tasks may be stored in a queue that is configured to store tasks for multiple memory access requests associated with one or more VSDs of the node 210.

The BE Daemon 350 may also generate one or more threads to execute the VSD Engine 353. The VSD Engine 353 may operate asynchronously from the BE Server 352. The VSD Engine 353 is configured to process the tasks generated by the BE Server 352. In other words, the VSD Engine 353 pops tasks from the queue and processes the tasks to determine which VSD is associated with the memory access request. The VSD may be identified by a VSD identifier, which corresponds to one of the VSD objects 375. For a particular memory access request, the VSD Engine 353 may call a method associated with the corresponding VSD object 375 that generates a task to be processed by the RSD Engine 354. The method may take a memory access request for a specific address of the VSD and translate the memory access request into a memory access request for a specific address of an RSD. The memory access request for the RSD is then included in the task added to a queue associated with the RSD Engine 354.

The BE Daemon 350 may also generate one or more threads to execute the RSD Engine 354. The RSD Engine 354 may operate asynchronously from the VSD Engine 353. The RSD Engine 354 is configured to process the tasks generated by the VSD Engine 353. In other words, the RSD Engine 354 pops tasks from the queue and processes the tasks to determine which RSD is associated with the memory access request. The RSD may be identified by an RSD identifier, which corresponds to one of the RSD objects 376. For a particular memory access request, the RSD Engine 354 may call a method associated with the corresponding RSD object 376 that generates a task to be processed by either the I/O Manager 355 or the BE Remote Protocol 351. If the RSD object 376 is associated with a local RSD 214, then the memory access request for the local RSD 214 is included in a task added to a queue associated with the I/O Manager 355. If the RSD object 376 is associated with a remote RSD 214, then the memory access request for the remote RSD 214 is included in a task added to a queue associated with the BE Remote Protocol 351 to be forwarded to the node 210 that includes the remote RSD 214.

The BE Daemon 350 may also generate one or more threads to execute the I/O Manager 355. The I/O Manager 355 may operate asynchronously from the RSD Engine 354. The I/O Manager 355 is configured to process the tasks generated by the RSD Engine 354. In other words, the I/O Manager 355 pops tasks from the queue and processes the tasks to generate memory access requests for the device driver 312 of the host operating system 311. The memory access requests may be formatted to access a particular block of an RSD 214. In other words, the I/O Manager 355 generates memory access requests as if an application executed by the host operating system was attempting to access a physical drive coupled to the processor 211. The I/O Manager 355 also receives acknowledgement from the device driver 312 when the memory access request has been completed. Since there can be a significant delay from when a memory access request is initiated and when the memory access request is completed, the I/O Manager 355 may manage a plurality of memory access requests in parallel.

The BE Daemon 350 may also generate one or more threads to execute the BE Remote Protocol 351. The BE Remote Protocol 351 may operate asynchronously from the RSD Engine 354. The BE Remote Protocol 351 is configured to process the tasks generated by the RSD Engine 354. In other words, the BE Remote Protocol 351 pops tasks from the queue and processes the tasks to generate memory access requests that are transmitted to a BE Daemon 350 of a remote node 210 that includes the RSD 214 corresponding to the memory access request. The BE Remote Protocol 351 also receives acknowledgement from the BE Daemon 350 of the remote node 210 when the memory access request has been completed. In the case of a write request, the BE Remote Protocol 351 may also transmit the data to the remote node 210 along with the memory access request. In the case of a read request, the BE Remote Protocol 351 may also receive the data from the remote node 210 when the memory access request has been completed by the remote node 210. Since there can be a significant delay from when a memory access request is transmitted to the remote node 210 and when the memory access request is completed, the BE Remote Protocol 351 may manage a plurality of memory access requests to one or more remote nodes 210 in parallel.

In one embodiment, each layer in the protocol stack 500 may acknowledge the completion of a corresponding memory access request by utilizing a callback function. Each task generated for a particular layer of the protocol stack 500 may include a callback function that is called when the task is completed. In other words, a particular layer of the protocol stack 500 that generates a task for a lower layer of the protocol stack 500 may specify a callback function within the task that the lower layer will execute when the task is completed by the lower layer. The callback function indicates to the particular layer that the task has been processed by the lower layer. In the case of a memory access request processed by the protocol stack 500, multiple callback functions can be used to traverse the stack such that the BE Server 352 may transmit an acknowledgement to the BE client 363 that the memory access request has been completed. In one embodiment, each callback function is configured to generate a new task for the next layer in the protocol stack 500. The callback function may include arguments such as a handle to the memory access request associated with the completed task.

It will be appreciated that each layer of the protocol stack 500 operates completely asynchronously from each of the other layers. Furthermore, the layers of the protocol stack 500 are implemented by separate and distinct thread pools (i.e., one or more threads) that are used to process the tasks generated by adjacent layers of the protocol stack 500. Because each layer is executed asynchronously, there is a significant latency that is introduced between each layer corresponding to a delay from when a task is generated by one layer and when a thread is executed to process the task in another layer. This latency is not desirable and makes applications executing on the VMs 360 less efficient.

Figure 6:
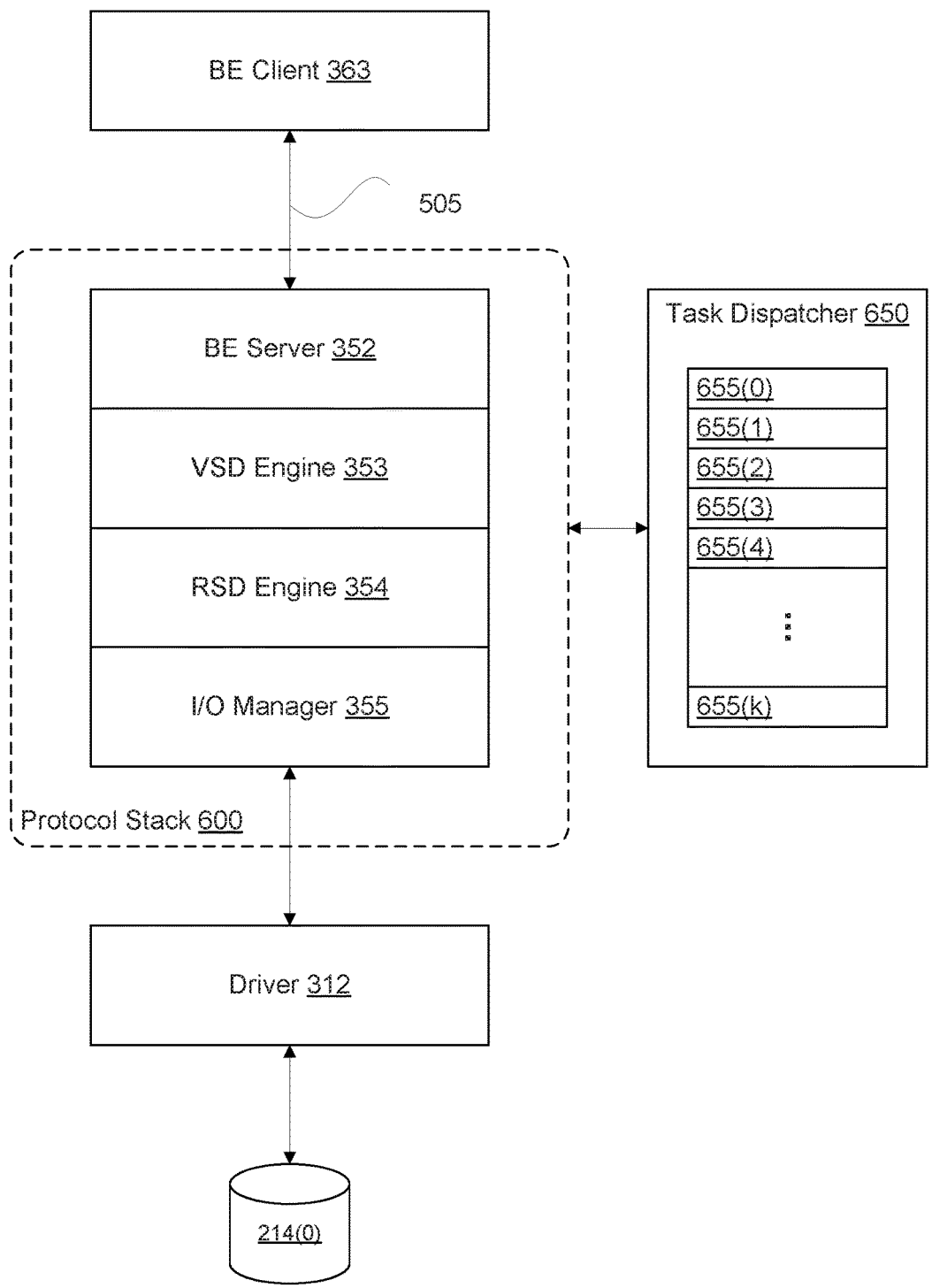
FIG. 6 illustrates a task dispatcher for managing a protocol stack, in accordance with one embodiment.

FIG. 6 illustrates a task dispatcher 650 for managing a protocol stack 600, in accordance with one embodiment. It will be appreciated that the latency caused by generating new tasks between each layer of the protocol stack 500 could be reduced if a single task could be configured to manage multiple layers of the protocol stack 500. As shown in FIG. 6, the BE Daemon 350 may also include a task dispatcher 650 that manages threads for processing tasks associated with a protocol stack 600. In one embodiment, the task dispatcher 650 may manage a thread pool having a plurality of threads 655 that may be allocated to manage tasks associated with the protocol stack 600.

Again, the host operating system 311 executes the BE Daemon 350 as a process. The BE Daemon 350 may generate one or more threads to execute the task dispatcher 650. The task dispatcher 650 may manage the thread pool by assigning particular tasks to each available thread in the thread pool. The task dispatcher 650 may also be configured to manage execution of each of the threads 655, such as handling scheduling of tasks for execution by the available threads 655.

Each of the threads 655 for processing tasks associated with the protocol stack 600 may implement a state machine for traversing the layers of the protocol stack 600. The task dispatcher 650 monitors memory access requests transmitted to the BE Server 352 from one or more BE Clients 363. For example, memory access requests received from a BE Client 363 may be stored in a queue. The task dispatcher 650 may monitor the queue to determine if there are any pending memory access requests. If there are pending memory access requests in the queue, then the task dispatcher 650 may pop a pending memory access request from the queue and generate a task for processing the memory access request. The active tasks may be allocated to any available threads 655 to be processed according to the protocol stack 600. The state machine implemented by the thread 655 may begin in an initial state associated with the first layer of the protocol stack 600, the BE Server 352.

The initial state may call a method or methods defined by the BE Server 352 for processing the memory access request. The BE Server 352 may maintain state associated with each memory access request received from the one or more BE Clients 363. The state may include a task identifier that associates a particular task with a memory access request, an identifier that specifies the BE Client 363 associated with the memory access request, and any other information corresponding to the task. The functionality of the BE Server 352 in the protocol stack 600 is modified slightly compared to the functionality of the BE Server 352 in the protocol stack 500. Instead of generating a task for the VSD Engine 353, the BE Server 352 causes the state machine for the thread 655 managed by the task dispatcher 650 to transition to a new state associated with the second layer of the protocol stack 600. The BE Server 352 may also return a handle to a callback function that is stored within state information for the task maintained by the task dispatcher 650 so that the callback function may be called when the second layer of the protocol stack 600 has completed processing of the memory access request.

It will be appreciated that the method of the BE Server 352 is configured to cause the thread 655 to "step" the task and transition to a new state in the state machine instead of generating a new task for an asynchronously executed layer of the protocol stack 600. The thread 655 in the task dispatcher 650 handles all calls of methods implemented by the BE Server 352, VSD Engine 353, the RSD Engine 354, the I/O Manager 355, and the BE Remote Protocol 351. Thus, the layers of the protocol stack 600 do not process the memory access request(s) asynchronously, but instead a single task scheduler handles the processing of the memory access request using the functionality implemented by the various layers of the protocol stack 600.

In the new state, the thread 655 processes the memory access request by the second layer of the protocol stack 600, to determine which VSD is associated with the memory access request. The thread 655 calls a method of the VSD Engine 353 in order to process the memory access request. The VSD Engine 353 identifies a VSD identifier corresponding to the memory access request, which corresponds to one of the VSD objects 375. For a particular memory access request, the VSD Engine 353 may call a method associated with the corresponding VSD object 375 (i.e., the VSD object 375 identified by the VSD identifier). The method associated with the corresponding VSD object 375 may identify an RSD address corresponding to the memory access request by converting an address in the VSD address space into an address in the RSD address space. The method may also cause the state machine for the thread 655 to transition to another state.

In the new state, the thread 655 may then call a method of the RSD Engine 354 in order to continue to process the memory access request down the protocol stack 600. The RSD Engine 354 identifies a RSD identifier based on the RSD address associated with the memory access request, the RSD identifier corresponding to one of the RSD objects 376. For a particular memory access request, the RSD Engine 354 may call a method associated with the corresponding RSD object 376. The method may cause the thread 655 to transition to another state. If the RSD object 376 is a local RSD 214, then the method will cause the thread 655 to transition to a state associated with the I/O Manager 355. However, if the RSD object 376 is a remote RSD 214, then the method will cause the thread 655 to transition to a state associated with the BE Remote Protocol 351. The state associated with the I/O Manager 355 causes the thread 655 to call a method of the I/O Manager 355 in order to generate a system call for performing the memory access operation on the actual RSD 214 using the driver 312. In contrast, the state associated with the BE Remote Protocol 351 causes the thread 655 to call a method of the BE Remote Protocol 351 in order to generate a memory access request that is transmitted to the node 210 that includes the RSD 214 over the network 370

In one embodiment, the state machine implemented by the threads 655 determine whether the task will immediately process the memory access request at the next level in the protocol stack 600 or whether the task will be stalled to process the memory access request at the next level of the protocol stack 600 at a later point in time. Each state in the state machine may include a test to determine whether the task is stalled based on various criteria. In one embodiment, the task dispatcher 650 tracks the direction of each task up or down the protocol stack 600 by maintaining state information for each task that indicates which direction a task is moving in the protocol stack 600. If the direction changes, then the task dispatcher 650 may stall the task, saving state information for the task to a memory and adding the task back to a queue of pending tasks so that the thread 655 may be assigned another pending task in the queue. However, if the direction does not change, then the current task may continue to process the memory access request up or down the protocol stack 600. As referred to herein, the direction refers to the traversal of layers of the protocol stack 600. For example, moving down the stack refers to a processing order starting with the BE Server 352, followed by the VSD Engine 353, the RSD Engine 354, and finally the I/O Manager 355 or the BE Remote Protocol 351. Moving up the stack refers to a processing order starting with the I/O Manager 355 or BE Remote Protocol 351, followed by the RSD Engine 354, the VSD Engine, 353, and finally the BE Server 352.

In one embodiment, the direction of a task may be tracked with a single bit of state information for the task that is maintained by the task dispatcher 650. As the task dispatcher generates a task based on a memory access request received from a BE Client 363, the state information for the task is initially set to identify the task as moving down the protocol stack 600. The task dispatcher 650 assigns the task to a thread 655, and the thread 655 processes the memory access request by calling a method of the BE Server 352. The BE Server 352 generates state information corresponding to the task and causes the state machine to step to a new state associated with the second layer of the protocol stack 600. The new state may cause the thread 655 to call a method of the VSD Engine 353. However, processing of the memory access request by the VSD Engine 353 may result in an error. For example, the memory access request may correspond with a VSD that has been closed, which does not allow a program on a VM 360 to read or write to the VSD. The method of the VSD Engine 353 may indicate an error has occurred causing the state machine for the thread 655 to transition to a new state. In the new state, the thread 655 may update the state information to indicate the direction of the task has changed to move up the protocol stack 600.

Again, because the direction of the task has changed, the task may be stalled. Thus, there will be some latency between when the task reverses direction back up the protocol stack 600 and when the thread 655 processes the task via one or more layers of the protocol stack 600. This latency is a byproduct caused by queueing the tasks within a particular layer of the protocol stack 600. For example, the task dispatcher 650 may be processing multiple threads 655 simultaneously through different layers of the protocol stack 600. A first thread 655 may be in a first state where the first thread 655 calls a method of the VSD Engine 353 to get an RSD address associated with a first memory access request. A second thread 655 may be in a second state where the second thread 655 calls a method of the RSD Engine 353 to determine how to access the RSD 214 (i.e., via the I/O Manager 355 or the BE Remote Protocol 351). Each layer of the protocol stack 600 may use mutual exclusion (mutex) mechanisms (e.g., semaphores) to prevent any two threads from processing their corresponding tasks using the same layer of the protocol stack 600 at the same time. This may be implemented because each layer of the protocol stack 600 maintains internal state information that is only designed for processing one task at a time. In such embodiments, the thread 655 may need to acquire the mutex whenever a new state is entered in order to process the task at the corresponding layer of the protocol stack 600. While moving in any one direction up or down the protocol stack 600, the thread 655 may not be at risk of running into a deadlock condition (i.e., threads moving in any direction up or down the stack will eventually emerge from the top of the stack or drain from the bottom of the stack as each layer finishes processing the tasks at hand). However, threads 655 changing direction in the protocol stack 600 can lead to deadlock conditions where one thread trying to acquire a mutex at one layer is blocked by another thread trying to acquire a mutex at another layer, and vice versa. In one embodiment, the deadlock condition can be avoided by adding a new task to the queue in the task dispatcher 650 that can be processed at a later point in time when the resources in the protocol stack 600 are available and the deadlock condition will be avoided. The current task may be terminated, and the mutex released, as the new task will continue where the previous task left off moving up the protocol stack 600. In another embodiment, a task changing direction in the stack may be configured to release its mutex, and the thread 655 associated with the task may wait until it can acquire a mutex for the next layer of the protocol stack 600 to continue processing the task. While the task is not simply returned to the back of the queue with a plurality of other tasks waiting to be processed by the task dispatcher 650, the thread 655 may still experience some latency while the thread 655 spins trying to acquire the mutex for the next layer of the protocol stack 600.

In another embodiment, the task dispatcher 650 is associated with two different thread pools. A first thread pool may be allocated for normal tasks and a second thread pool may be allocated for high priority tasks. By keeping a second thread pool available for high priority tasks, such tasks are ensured some minimum amount of resources that are allocated for the high priority tasks. In addition, depending on the number of cores available to process the threads, the threads in the second thread pool may be given priority for execution. In other words, high priority tasks will be executed prior to normal tasks when cores are not available to execute all threads in the thread pools concurrently.

The task dispatcher 650 may store whether a task is a normal task or a high priority task within the task state information maintained by the task dispatcher 650. The task state information may be used to determine whether the task is allocated to a thread 655 in the first thread pool or a thread in the second thread pool. In one embodiment, a memory access request generated by a BE Client 363 may indicate whether the memory access request should be designated as having a higher priority. For example, particular VMs 360 may be provisioned to perform high priority operations and, therefore, any memory access request generated by the BE Client 363 in that VM 360 will indicate that the memory access request should be designated as having a higher priority.

In one embodiment, the task dispatcher 650 may manage when tasks are eligible to be processed by the threads 655. The task dispatcher 650 may mark any pending task as eligible or ineligible to be assigned to a free thread 655. Only tasks marked as eligible may be assigned to a free thread 655 and processed according to the protocol stack 600. In another embodiment, the task dispatcher 650 may mark any pending task as eligible at a specified time, which may ensure a particular delay until the task is executed by a free thread 655. Furthermore, the task dispatcher 650 may change a task from eligible to ineligible which will cause the task to be skipped until the task dispatcher 650 marks the task as eligible.

In summary, the task dispatcher 650 is a process executed by a thread on a processor 211 of the node 210 that manages tasks associated with memory access requests of block devices included in the node 210. The task dispatcher 650 manages the tasks by calling methods implemented by a plurality of layers of a protocol stack 600 and by tracking the traversal of the task through the protocol stack 600.

Figure 7A:
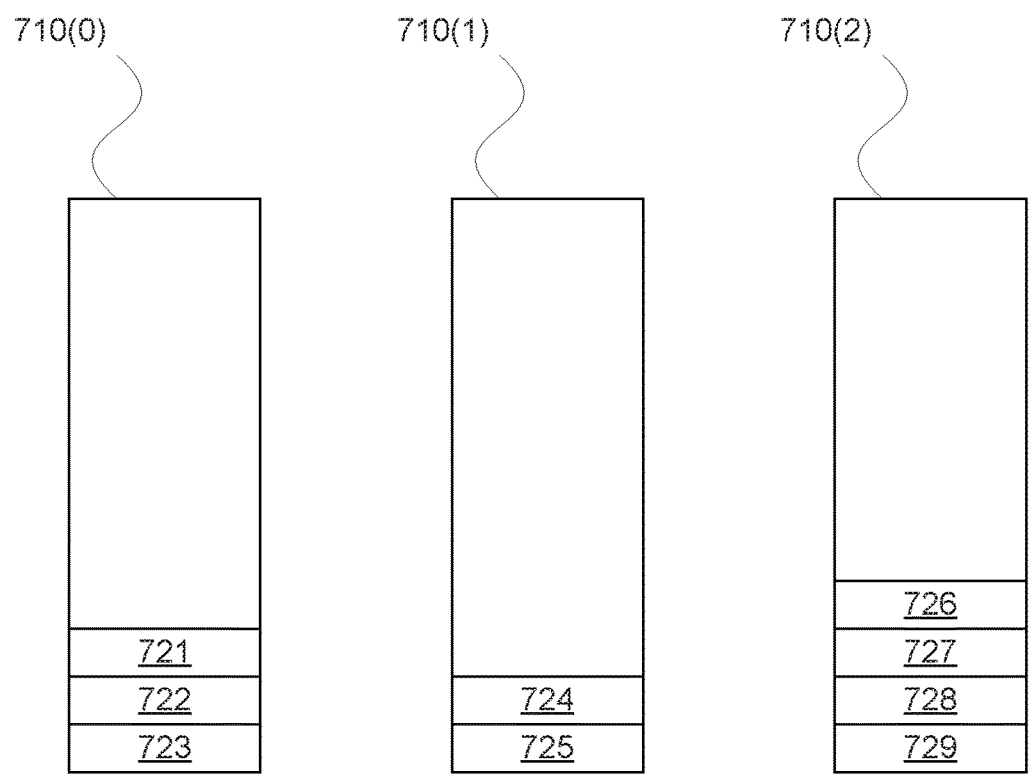
FIGS. 7A & 7B illustrate task lanes associated with the task dispatcher of FIG. 6, in accordance with one embodiment.
Figure 7B:
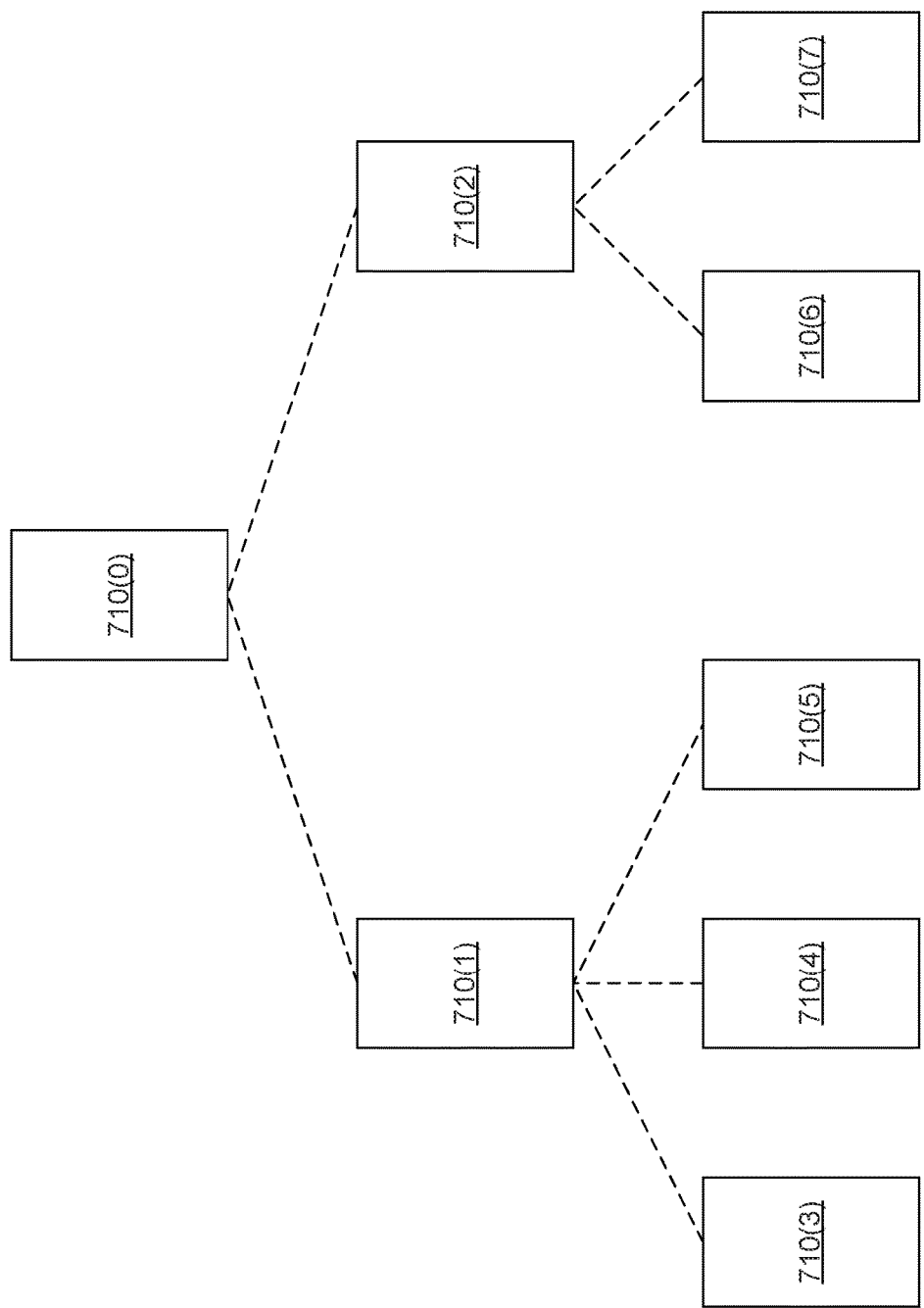

FIGS. 7A & 7B illustrate task lanes associated with the task dispatcher 650 of FIG. 6, in accordance with one embodiment. As described above, the task dispatcher 650 may maintain a queue of pending tasks, each new task generated by the task dispatcher 650 being pushed onto the queue until a thread is available to process the task according to the protocol stack 600. In one embodiment, instead of a single queue, the task dispatcher 650 may implement a number of task lanes 710, each task lane being a separate queue for related tasks.

For purposes of illustration, FIG. 7A shows three different task lanes 710: a first task lane 710(0), a second task lane 710(1), and a third task lane 710(2). Tasks may be added to one of the task lanes 710 as the task is generated. As shown, three tasks (e.g., tasks 721, 722, and 723) have been added to the first task lane 710(0); two tasks (e.g., tasks 724 and 725) have been added to the second task lane 710(1); and four tasks (e.g., tasks 726, 727, 728, and 729) have been added to the third task lane 710(2).

Each task generated by the task dispatcher 650 may be pushed onto a particular task lane. Task lanes 710 enable synchronization between related tasks. For example, all tasks associated with a particular VSD may be stalled indefinitely while a snapshot of the VSD is being created to avoid making any changes to the data in the VSD during the creation of the snapshot. A synchronization mechanism may be used to block all tasks within a particular task lane 710 from being executed. The use of multiple task lanes 710 enables other unrelated tasks in different task lanes (e.g., task lane 710(1) and 710(2)) to be processed while a particular task lane (e.g., task lane 710(0)) is blocked.

In one embodiment, the task dispatcher 650 is configured to associate one task lane with each VSD object 375 in the node 210. As a memory access request is received from a BE Client 363, the task dispatcher 650 may determine which VSD is referenced by the address included in the memory access request. For example, the task dispatcher 650 may call a method of the VSD Engine 353 in order to identify a VSD identifier corresponding to the address in the memory access request. The VSD identifier may be used to push the task for processing the memory access request onto a corresponding task lane 710 associated with the VSD object 375 specified by the VSD identifier.

As shown in FIG. 7B, in one embodiment, task lanes 710 may be implemented within a hierarchical structure. In other words, each task lane 710 may be associated with one or more additional task lanes 710 at another level of the hierarchy. In other words, each of the task lanes 710 in a top level of the hierarchy may also be associated with one or more additional task lanes 710 at a next lower level of the hierarchy, and so on for a number of additional levels of the hierarchy. The task lane hierarchy enables a particular, parent task lane to block all child task lanes associated with the parent task lane.

For example, a task lane may be defined for a particular VSD as well as all snapshots of the VSD. Additional task lanes at a lower level of the hierarchy may be associated with the high-level task lane. One of the lower-level task lanes may be defined for tasks associated with the VSD, another lower-level task lane may be defined for tasks associated with a first snapshot of the VSD, another lower-level task lane may be defined for tasks associated with a second snapshot of the VSD, and another lower-level task lane may be defined for tasks associated with a third snapshot of the VSD. A synchronization mechanism or other barrier-type instruction may block tasks associated with the VSD or any of the snapshots of the VSD individually by associating the synchronization mechanism/barrier-type instruction with one of the lower-level task lanes. Alternatively, a synchronization mechanism or other barrier-type instruction may block tasks associated with the VSD and all of the snapshots of the VSD collectively by associating the synchronization mechanism/barrier-type instruction with the higher-level task lane.

It will be appreciated that the hierarchy of the task lanes may include more than two levels. For example, a particular task lane may be used to block all memory access requests for a particular VSD or snapshot of a VSD; a next higher level task lane may be used to block all memory access requests for the particular VSD and any snapshots of the VSD; a next higher level task lane may be used to block all memory access requests for multiple VSDs and any associated snapshots of the VSDs; and a next higher level task lane may be used to block all memory access requests for all VSDs within a node 210.

As shown in FIG. 7B, the hierarchy may include a first task lane 710(0) at the top level of the hierarchy. The first task lane 710(0) may be used to block tasks for all VSDs of the node 210. The first task lane 710(0) may be specified as a parent task lane for a second task lane 710(1) and a third task lane 710(2). The second task lane 710(1) may be used to block tasks for a first VSD of the node 210, and the third task lane 710(2) may be used to block tasks for a second VSD of the node 210. The second task lane 710(1) may be specified as a parent task lane for a fourth task lane 710(3), a fifth task lane 710(4), and a sixth task lane 710(5). The fourth task lane 710(3) may be used to block tasks for the first VSD of the node 210 (but not tasks related to any snapshots of the first VSD), the fifth task lane 710(4) may be used to block tasks for a first snapshot of the first VSD of the node 210, and the sixth task lane 710(5) may be used to block tasks for a second snapshot of the first VSD of the node 210. Similarly, the third task lane 710(2) may be specified as a parent task lane for a seventh task lane 710(6) and an eighth task lane 710(7). The seventh task lane 710(6) may be used to block tasks for the second VSD of the node 210 (but not tasks related to any snapshots of the second VSD), and the eighth task lane 710(7) may be used to block tasks for a first snapshot of the second VSD of the node 210.

It will be appreciated that the task lanes may be used to group related tasks in any manner that is technically feasible. For example, a task lane does not necessarily have to apply to a particular VSD. A task lane may be created for tasks related to a plurality of VSDs. Similarly, multiple task lanes may be created for tasks related to a single VSD. One of the task lanes may be associated with read requests for a VSD and another task lane may be associated with write requests for the VSD. Additionally, different task lanes may be utilized for high priority tasks and low priority tasks. Tasks in task lanes for low priority tasks may be processed by threads of a first thread pool, and tasks in task lanes for high priority tasks may be processed by threads of a second thread pool, with tasks in the second thread pool given priority access to hardware resources of the node 210 for execution.

Figure 8:
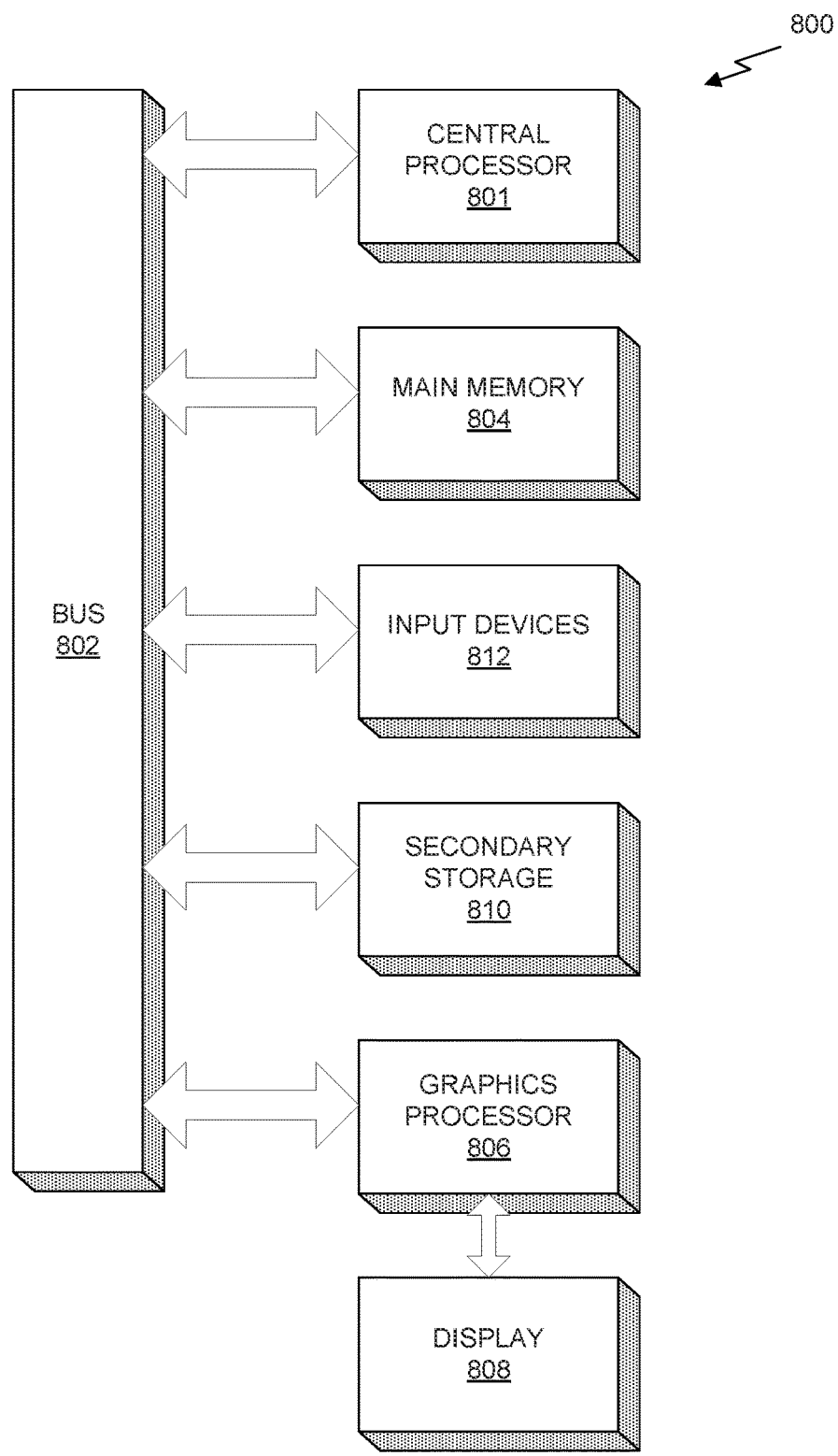
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. The system 800 may comprise a node 210 of the cluster 200. As shown, a system 800 is provided including at least one central processor 801 that is connected to a communication bus 802. The communication bus 802 may be implemented using any suitable protocol, such as PCI (Peripheral Component Interconnect), PCI-Express, AGP (Accelerated Graphics Port), HyperTransport, or any other bus or point-to-point communication protocol(s). The system 800 also includes a main memory 804. Control logic (software) and data are stored in the main memory 804 which may take the form of random access memory (RAM).

The system 800 also includes input devices 812, a graphics processor 806, and a display 808, i.e. a conventional CRT (cathode ray tube), LCD (liquid crystal display), LED (light emitting diode), plasma display or the like. User input may be received from the input devices 812, e.g., keyboard, mouse, touchpad, microphone, and the like. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 804 and/or the secondary storage 810. Such computer programs, when executed, enable the system 800 to perform various functions. The memory 804, the storage 810, and/or any other storage are possible examples of computer-readable media.

In one embodiment, the architecture and/or functionality of the various previous figures may be implemented in the context of the central processor 801, the graphics processor 806, an integrated circuit (not shown) that is capable of at least a portion of the capabilities of both the central processor 801 and the graphics processor 806, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, laptop computer, server, workstation, game consoles, embedded system, and/or any other type of logic. Still yet, the system 800 may take the form of various other devices including, but not limited to a personal digital assistant (PDA) device, a mobile phone device, a television, etc.

Further, while not shown, the system 800 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
allocating a thread, executed by a processor included in a node, to process a task according to a protocol stack for handling memory access requests associated with one or more block devices included in the node;
executing the thread to process the task, wherein the thread implements a state machine that manages calls to two or more layers of the protocol stack; and
allocating a second thread, executed by the processor, to manage the allocation of a thread pool for processing a plurality of tasks associated with a plurality of memory access requests, wherein the second thread is configured to stall the thread processing the task when a direction of the task changes.

2. The method of claim 1, wherein the processor is multi-threaded and two or more threads are executed by the processor simultaneously.

3. The method of claim 2, further comprising:
allocating a third thread to process a second task according to the protocol stack; and
executing the third thread to process the second task,
wherein the thread is included in a first thread pool allocated to tasks having a first priority and the third thread is included in a second thread pool allocated to tasks having a second priority that is higher than the first priority.

4. The method of claim 1, wherein the protocol stack includes a first layer that implements a server for communicating with one or more clients that generate memory access requests for the one or more block devices.

5. The method of claim 4, wherein the protocol stack includes a second layer associated with one or more virtual storage device objects, and wherein each memory access request includes an address in a virtual storage device address space.

6. The method of claim 5, wherein the protocol stack includes a third layer associated with one or more real storage device objects corresponding to the one or more block devices.

7. The method of claim 1, wherein the task is pushed onto a first task lane in a plurality of task lanes.

8. The method of claim 7, wherein the task is stalled based on a barrier instruction associated with the first task lane.

9. The method of claim 7, wherein the plurality of task lanes are included in a task lane hierarchy, and wherein a barrier instruction associated with a parent task lane may stall any task associated with a child task lane corresponding to the parent task lane.

10. A non-transitory computer-readable storage medium storing instructions that, when executed by a processor, cause the processor to perform steps comprising:
    allocating a thread, executed by a processor included in a node, to process a task according to a protocol stack for handling memory access requests associated with one or more block devices included in the node;
    executing the thread to process the task, wherein the thread implements a state machine that manages calls to two or more layers of the protocol stack; and
    allocating a second thread, executed by the processor, to manage the allocation of a thread pool for processing a plurality of tasks associated with a plurality of memory access requests, wherein the second thread is configured to stall the thread processing the task when a direction of the task changes.

11. The computer-readable storage medium of claim 10, the steps further comprising:
    allocating a third thread to process a second task according to the protocol stack; and
    executing the third thread to process the second task,
    wherein the thread is included in a first thread pool allocated to tasks having a first priority and the third thread is included in a second thread pool allocated to tasks having a second priority that is higher than the first priority.

12. The computer-readable storage medium of claim 10, wherein the protocol stack includes:
    a first layer that implements a server for communicating with one or more clients that generate memory access requests for the one or more block devices;
    a second layer associated with one or more virtual storage device objects, wherein each memory access request includes an address in a virtual storage device address space; and
    a third layer associated with one or more real storage device objects corresponding to the one or more block devices.

13. A system comprising:
    one or more block devices;
    a memory that includes a protocol stack for handling memory access requests associated with the one or more block devices; and
    a processor coupled to the memory and configured to:
        allocate a thread to process a task according to the protocol stack,
        execute the thread to process the task, wherein the thread implements a state machine that manages calls to two or more layers of the protocol stack, and
        allocate a second thread, executed by the processor, to manage the allocation of a thread pool for processing a plurality of tasks associated with a plurality of memory access requests, wherein the second thread is configured to stall the thread processing the task when a direction of the task changes.

14. The system of claim 13, the steps further comprising:
    allocating a second thread to process a second task according to the protocol stack; and
    executing the second thread to process the second task,
    wherein the thread is included in a first thread pool allocated to tasks having a first priority and the second thread is included in a second thread pool allocated to tasks having a second priority that is higher than the first priority.

15. The system of claim 13, wherein the one or more block devices, the memory, and the processor are included in a first node, the system further comprising a second node, wherein a processor in the second node generates a memory access request associated with the task.

* * * * *